US010055830B2

(12) United States Patent
Durrant et al.

(10) Patent No.: US 10,055,830 B2
(45) Date of Patent: Aug. 21, 2018

(54) PASS FAIL SENTENCING OF HOLLOW COMPONENTS

(71) Applicant: ROLLS-ROYCE plc, London (GB)

(72) Inventors: George Durrant, Derby (GB); Stefan J Wagner, Derby (GB); Felicity Freeman, Derby (GB)

(73) Assignee: ROLLS-ROYCE plc, London (GB)

( * ) Notice: Subject to any disclaimer, the term of this patent is extended or adjusted under 35 U.S.C. 154(b) by 17 days.

(21) Appl. No.: 15/296,737

(22) Filed: Oct. 18, 2016

(65) Prior Publication Data

US 2017/0132777 A1 May 11, 2017

(30) Foreign Application Priority Data

Nov. 10, 2015 (GB) .................................. 1519801.3

(51) Int. Cl.
*G06K 9/00* (2006.01)
*G06T 7/00* (2017.01)

(52) U.S. Cl.
CPC .. *G06T 7/0004* (2013.01); *G06T 2207/10081* (2013.01)

(58) Field of Classification Search
USPC ............... 250/559.05; 378/54; 382/103, 144; 700/98
See application file for complete search history.

(56) References Cited

U.S. PATENT DOCUMENTS

| 5,999,636 | A * | 12/1999 | Juang ...................... B41F 33/02 250/559.05 |
| 6,735,745 | B2 * | 5/2004 | Sarig .......................... G03F 1/84 382/144 |
| 6,895,073 | B2 * | 5/2005 | Shih ........................ G01N 23/04 378/197 |
| 7,840,247 | B2 * | 11/2010 | Liew ....................... A61B 6/482 378/54 |
| 7,920,726 | B2 * | 4/2011 | Okazaki ................ H04N 19/176 382/103 |
| 9,075,026 | B2 * | 7/2015 | Urano ................. G01N 21/9501 |
| 9,558,547 | B2 * | 1/2017 | Alam ....................... G06T 7/001 |
| 9,704,293 | B2 * | 7/2017 | Date ........................ G06T 17/20 |

(Continued)

FOREIGN PATENT DOCUMENTS

JP 2004271222 A 9/2004

OTHER PUBLICATIONS

May 15, 2017 extended European Search Report issued in European Patent Application No. 16194278.4.

(Continued)

*Primary Examiner* — Xuemei Chen

(74) *Attorney, Agent, or Firm* — Oliff PLC

(57) ABSTRACT

A method for sentencing a manufactured component as a pass or fail is described. The method involves zoning a two-dimensional image of the component, weighting individual zones according to their importance in the load bearing function and comparing overall weighted dimensions against those of a pre-defined compliant component design. By considering the internal and external dimensions and offsetting variations between zones, a more accurate assessment of compliance can be achieved. It is envisaged that components which might otherwise have been rejected and scrapped may be accepted resulting in material and cost savings.

16 Claims, 4 Drawing Sheets

(56) References Cited

U.S. PATENT DOCUMENTS

| | | | |
|---|---|---|---|
| 2010/0194562 A1* | 8/2010 | Lee | G07C 3/143 |
| | | | 340/540 |
| 2010/0220910 A1 | 9/2010 | Kaucic et al. | |
| 2013/0208978 A1* | 8/2013 | Ribnick | G01N 21/8914 |
| | | | 382/159 |
| 2014/0294136 A1 | 10/2014 | Koonankeil et al. | |
| 2015/0193925 A1 | 7/2015 | Alam | |
| 2016/0109876 A1* | 4/2016 | Addicott | G05B 19/4099 |
| | | | 700/98 |

OTHER PUBLICATIONS

Nolan, A. et al. "X-ray inspection utilizing knowledge based feature isolation with a neural network classifier". Image Understanding and the Man-Machine Interface III, vol. 1472, pp. 157-164, Aug. 1, 1991.

Noble, A. et al. "CAD-based Inspection using X-Ray Stereo". International Conference on Robotics and Automation, pp. 2361-2366, May 21, 1995.

May 10, 2016 Search Report issued in Great Britain Patent Application No. 1519801.3.

* cited by examiner

PASS FAIL SENTENCING OF HOLLOW COMPONENTS

TECHNICAL FIELD

The invention relates to the assessment of manufactured components for compliance with a predetermined structure. The invention is not limited to but has useful application in assessing cast components of a gas turbine engine for suitability to withstand operational loads.

BACKGROUND TO INVENTION

With some manufacturing processes, for example casting, it can be difficult to control the process accurately enough to obtain a completely consistent result. Where the component being manufactured has an important loadbearing function in an end product, it is known to undertake visual assessments and measurements of the component to determine if it is fit for its intended purpose.

It is known to manufacture turbine blades for a gas turbine engine using a casting process. Known inspection methods employ ultrasonic techniques to measure a thickness of an outer wall of a cast blade. The measured wall thickness is compared against a pre-defined minimum thickness which is known to cope with an expected load on the blade in an expected operating environment. The component is sentenced as pass or fail based on whether this pre-defined minimum external wall thickness is present around the blade circumference. A component which is sentenced as a fail may be scrapped at significant cost to the manufacturer.

STATEMENT OF INVENTION

The present invention provides a method for sentencing a manufactured component for compliance with an operational requirement, the method comprising;

a) pre-defining a nominal section for a compliant component;

b) dividing the pre-defined nominal section into a plurality of zones;

c) based on the relative contribution or relative susceptibility of each zone to a previously identified functional attribute of the component, assigning a weighting factor to each zone indicative of its relative contribution;

d) defining an acceptance criterion which is a function of cross-sectional dimensions in each zone multiplied by the assigned weighting factor;

e) generating an image of an entire section of the manufactured component in the same position as the nominal section for the compliant component is defined;

f) identifying in the generated image, zones comparable to the zones in the pre-defined nominal section;

g) measuring cross-sectional dimensions of the manufactured component in the generated image zones of step f) and for each, multiplying by the weighting factor assigned to the comparable zones of the pre-defined nominal section of step c);

h) performing the function of step d) on the weighted, measured sectional dimensions of the manufactured component;

i) comparing the outcome of step h) against the acceptance criterion of step d) and sentencing the manufactured component as a "pass" or "fail" dependent on its compliance or non-compliance with the acceptance criterion.

The invention has particular application to hollow components which comprise one or more enclosed internal spaces. Whereas prior art methods only make use of measurements of externally visible structural parts, the present invention uses data collected from enclosed structural parts as well as these externally visible parts to define acceptance criteria and determine if these criteria are met. The use of this additional data enables a more selective sentencing process which the inventors anticipate will result in more passes, a reduction in erroneous passes and a reduction in scrappage.

The manufactured component is typically a hollow component with a complex internal geometry, for example, a turbine blade. In such a component, load-bearing capability is influenced by the geometry of internal walls as well as an external wall.

For example (without limitation), the operational requirement may be; a load bearing requirement, a lifing requirement, a requirement for consistent performance for a specified period when subjected to a known thermal gradient, a requirement for consistent performance for a specified period under anticipated conditions of corrosion or oxidation attack.

For example (without limitation) the functional attribute may be related to; load-bearing, thermal performance or corrosion/oxidation resistance.

A nominal cross-section may be defined using a conventional CAD system.

In a component of complex internal geometry, distribution of load may vary across a cross-section. Factors which might influence the relative contribution to overall load-bearing of any defined zone of the cross section may include (without limitation), dimensions, porosity, position within the overall cross section, primary function and likelihood of exposure to extremes of temperature which might affect the physical properties of the material during operation. Such factors are taken into consideration in pre-determining a weighting factor for a given zone in the nominal component.

In addition or in an alternative to using operational load to determine the appropriate weighting factor, numerical prediction techniques such as thermo-mechanical modelling or life predictions might be used to determine weighting factors. It will be within the capabilities of the skilled addressee to determine appropriate weightings for zones defined in a nominal component whose intended loading condition and operating environment are known.

For example, a higher weighting factor might be imposed in a zone where a load-bearing failure in the zone might impact negatively on the operational life of the overall component. A lower weighting might be applied where a zone has a primary function which is other than to bear load and whose structural failure could be addressed by a simple repair without consequential impact on the continuing load-bearing performance of the overall component.

In some embodiments, the nominal section and corresponding cross section of the manufactured component are each a two-dimensional cross-section and the zones are divisions of the two-dimensional cross-section.

In some embodiments, the nominal section and corresponding cross section of the manufactured component are each a three-dimensional section and the zones are cross-sections taken at different planes across the three-dimensional section.

In some embodiments, the nominal section and corresponding cross section of the manufactured component are each a three-dimensional section and the zones are three-dimensional sub-sections of the three-dimensional section.

The measured dimensions in steps g) and h) may be lengths, widths or depths. The measured dimensions in steps g) and h) may be areas. Where the nominal section is a three-dimensional section, the measured dimensions in steps g) and h) may be volumes.

Optionally multiple acceptance criteria are defined. For example the acceptance criteria may be selected from; a loading factor, a factor for a minimum area for a certain feature, plus a maximum area for another feature. In such an embodiment, a "pass" might only be achievable if all the acceptance criteria are met. Acceptance criteria may be selected to account for a risk of failure in any one or more of multiple failure modes. For example (but without limitation), these modes might include; tensile fracture, creep, fatigue, or oxidation/corrosion attack. In the latter case, for example, an acceptance criterion might relate to wall thickness which is a determining factor in the operational life of the component before an external wall is breached.

In more complex embodiments, there may be relationships and/or dependencies between multiple criteria which affect the final acceptance criterion. For example, the final acceptance criterion could be conditional on given criterion being in a certain range that is biased to fit with a bias of a second criterion.

The step of generating an image may involve the use of computer tomography x-ray techniques which are known in the prior art, though their application in accordance with methods of the invention is novel. Such imaging techniques are, contrary to the previously discussed ultrasound techniques, useful in providing a two-dimensional segmental image of a component which includes detail of the enclosed internal as well as externally visible structure. In another example, the step of generating an image may involve a neutron diffraction technique. Other non-invasive methods for imaging a two-dimensional cross-section of a component will no doubt occur to the skilled addressee without the need for inventive thought. Layering of two-dimensional images or more sophisticated imaging systems known in the prior art may be used to produce a three-dimensional image of the component showing the internal as well as external structure.

Zones can be defined, for example by superimposing of a similarly scaled image of the pre-defined nominal component over that of the generated image of the manufactured component. A comparison of measured dimensions versus the nominal dimensions can then be made for each zone and the assigned weighting factors applied. The function can then be performed on the collected data and a comparison made with the acceptance criterion.

The size and number of zones is not essential and an optimum number and/or size of zone might differ for different nominal component geometries, loading conditions and/or operating environments. The zones may be of substantially equal size but this is not necessary since the weighting factors can account for the nominal zone dimensions. In more complex embodiments, each zone might comprise a pixel of the generated image.

In simple embodiments, for example where the nominal section and corresponding cross-section of the manufactured component are each a two-dimensional cross-section, the acceptance criterion may be defined as a sum of the product (for each zone) of the cross sectional area of component in a zone and the weighting factor. The method may be repeated for a plurality of different planes across a load-bearing direction of the component. In such an arrangement an acceptance criterion might be defined which involves a function of the result of step h) over the plurality of planes. Thus, there may be circumstances where one or more planes are outside preferred parameters for that particular plane but collectively, the results over the plurality of planes meets the acceptance criterion. This allows for a situation where a failing in one given plane can be compensated for by conditional or compensating results in one or more other planes of the plurality. For example where a first section has an area that is below a minimum for that section, it may be acceptable if other related sections are also below the minimum.

The acceptance criterion may be a simple target to be met or exceeded or may include a tolerance range within which the manufactured component must fall to receive a "pass" sentence. In other embodiments, more complex functions are used. For example, a function which describes the lifing influence of each pixel element of a cross-section of the component may be integrated over the entire cross-sectional area. The weighting factor thus incorporates a factor representative of the lifing influence of a pixel element. The function can then be compared against a pre-defined model allowing a full stress/lifing model prediction to be carried out for the manufactured component.

A tolerance may be a range of values having a defined maximum and/or minimum. Alternatively, the tolerance may be a percentage of a fixed value applied in a positive and/or negative direction. It will be well within the capabilities of the skilled person to identify a suitable tolerance without the application of inventive thought.

In one specific embodiment, the invention comprises; a method for sentencing a manufactured component for compliance with a defined load-bearing requirement, the method comprising;

a) pre-defining a nominal section for a compliant component across a load-bearing direction of the component;

b) dividing the pre-defined nominal section into a plurality of zones;

c) based on the relative contribution of each zone to the total load bearing capacity of the component, assigning a weighting factor to each zone indicative of its relative contribution;

d) defining an acceptance criterion which is a function of cross-sectional dimensions in each zone multiplied by the assigned weighting factor;

e) generating an image of an entire cross section of the manufactured component across a load-bearing direction of the component;

f) identifying in the generated image, zones comparable to the zones in the pre-defined nominal cross section;

g) measuring cross-sectional area of the manufactured component in the generated image zones of step f) and for each, multiplying by the weighting factor assigned to the comparable zones of the pre-defined nominal cross section of step c);

h) performing the function of step d) on the weighted, measured cross-sectional area of the manufactured component;

i) comparing the outcome of step h) against the acceptance criterion of step d) and sentencing the manufactured component as a "pass" or "fail" dependent on its compliance or non-compliance with the acceptance criterion.

An embodiment of the invention will now be described by way of example and with reference to the accompanying drawings in which;

DETAILED DESCRIPTION OF DRAWINGS AND EMBODIMENTS

Figure 1:
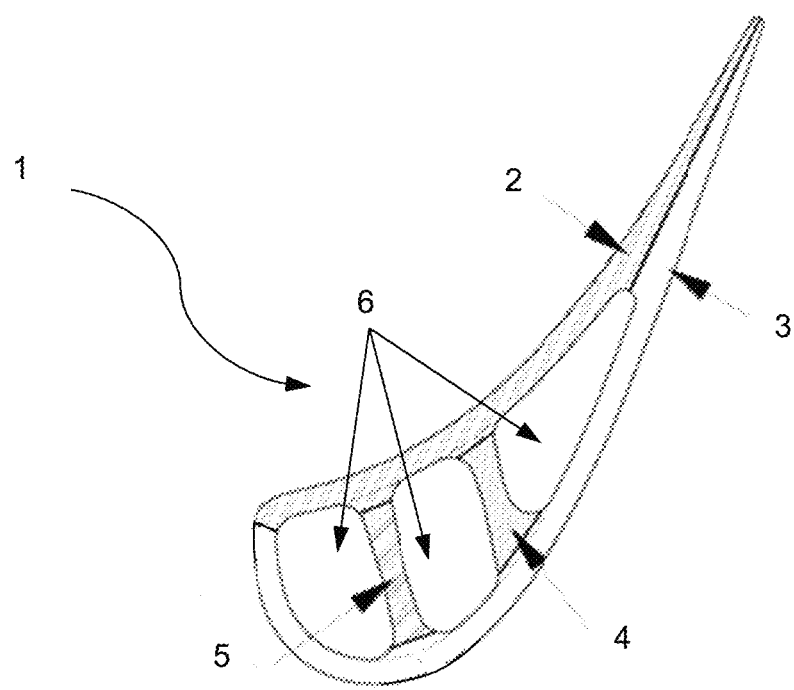
FIG. 1 shows a representation of a nominal turbine blade cross-section design with multiple zones identified.

As can be seen in FIG. 1, a nominal turbine blade cross-section 1 is divided into multiple zones which respectively correspond with a pressure side wall 2, a suction side wall 3, and trailing edge and leading edge webs 4, 5 extending across an internal space 6 of the blade. To each zone is applied a weighting $W_x$ which may be a different number for each zone. By way of example, zone 2 is assigned weighting $W_2$, zone 3 is assigned weighting $W_3$, zone 4 is assigned weighting $W_4$ and the zone 5 is assigned weighting $W_5$. The cross-sectional area $A_x$ for each of the defined zones can be defined as; for zone 2, $A_2$; for zone 3, $A_3$; for zone 4, $A_4$; and for zone 5, $A_5$.

The acceptance criterion is defined as a function of all values of $W_x$ and A. In a simple case, the function $f$ is the sum of the products $(W_2A_2+W_3A_3+W_4A_4+W_5A_5)$ and an acceptable solution for $f$ is a numerical value, for example N, optionally with a tolerance range, for example a percentage of N, say 3%. Thus the acceptance criterion might be defined as N+/−tN where t is a decimal defining a percentage of N. If t=0.03, then the tolerance range is +/−3%.

Figure 2:
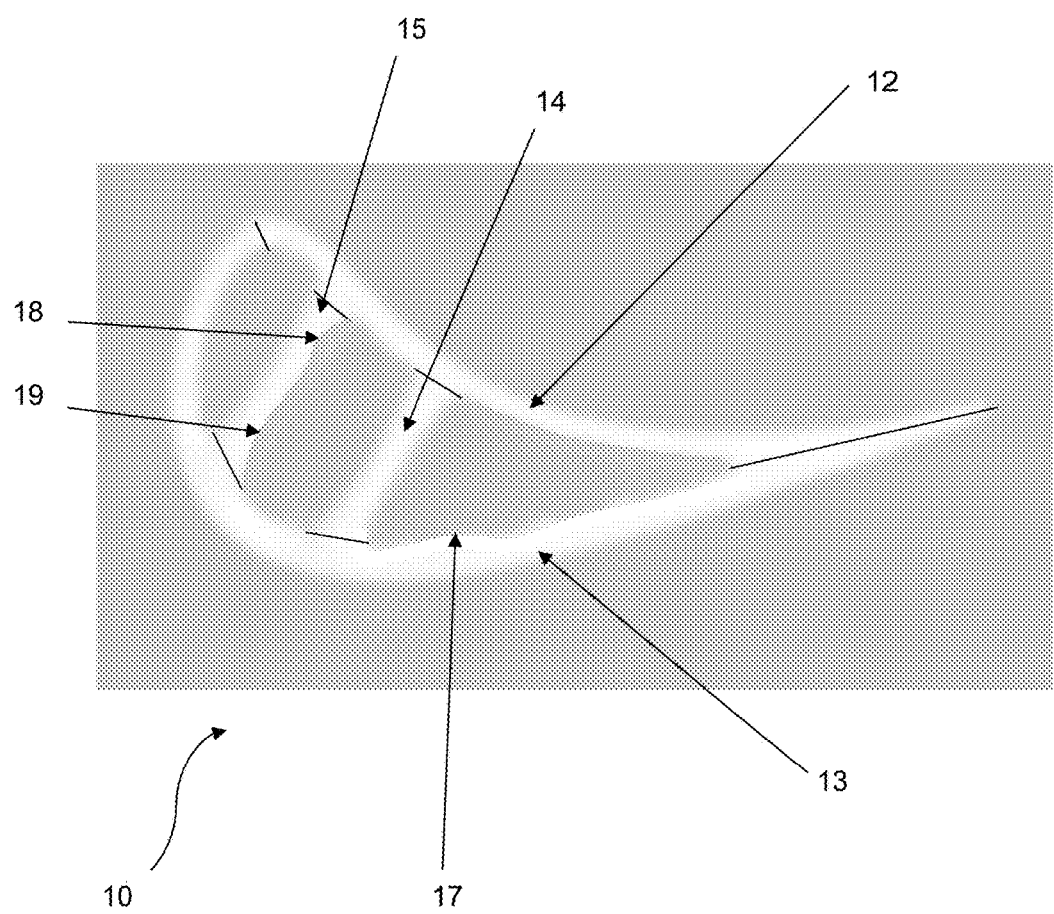
FIG. 2 shows the cross-sectional image of FIG. 2 divided into zones which correspond to those of the nominal design of FIG. 1.

In FIG. 2, a computer tomography cross-sectional image of a manufactured blade is produced in the same section as the pre-defined nominal section of FIG. 1. The image is divided into zones 12, 13, 14, 15 which correspond respectively to the zones 2, 3, 4, 5 of the nominal cross-section. It will be noted that in some zones there are variations in the wall dimensions 17, 18, 19 which may affect the performance of the blade.

Dimensions and cross-sectional area $A_y$ of each of the zones 12, 13, 14, 15 is measured using known techniques. For example, the measured areas are; for zone 12, $A_{12}$; for zone 13, $A_{13}$; for zone 14, $A_{14}$; and for zone 15, $A_{15}$. The pre-defined weightings are then applied to each measured zone area to provide the products $W_2A_{12}$, $W_3A_{13}$, $W_4A_{14}$ and $W_5A_{15}$. The function $f$ can then be performed on the products $W_xA_y$. Using the simple example above;

$$(W_2A_{12}+W_3A_{13}+W_4A_{14}+W_5A_{15})=Z$$

For the manufactured blade to comply with the acceptance criterion, Z must be equal to N+/−tN. If Z falls within this range, then the blade is sentenced as a "pass". If Z does not fall within the range, then the blade is sentenced as a "fail". It will be appreciated that the function $f$ could be replaced with more complex functions of the product $W_xA_y$ without departing from the inventive concept described herein.

Figure 3:
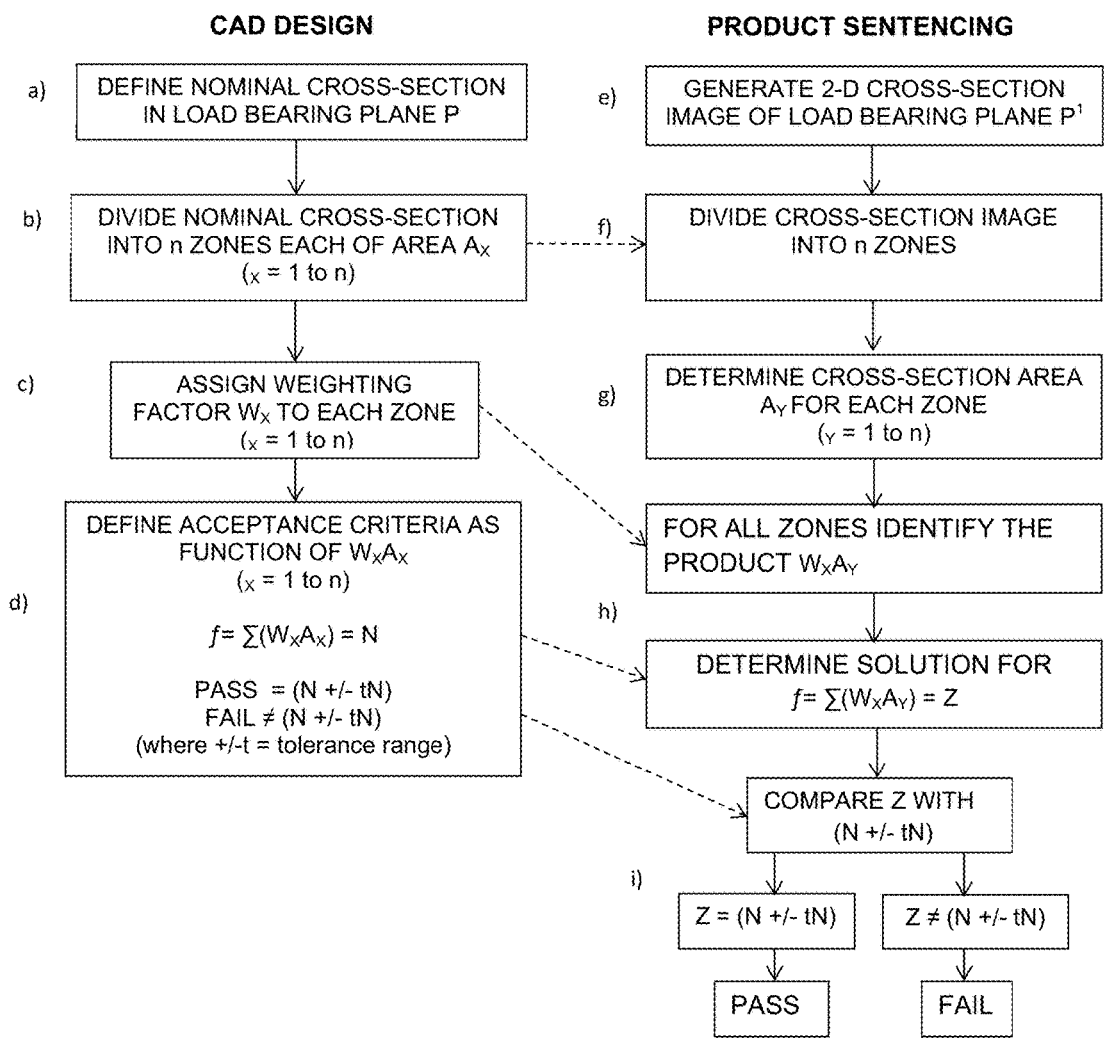
FIG. 3 shows a flow chart of the method receiving as input, parameters discussed in relation to the FIGS. 1 and 2.

FIG. 3 shows a process flow for performing an embodiment of a method in accordance with the invention. As can be seen, the method involves performing a number of steps. Steps a) to d) can be performed, for example, using a CAD design apparatus. In step a), a nominal cross section for a load bearing plane P of a hollow product such as the turbine blade of FIG. 1 is defined. In step b) the cross section is divided into x zones and a cross sectional area $A_x$ for each zone is identified. In step c), based on results of prior performed investigations into the relative contribution of each zone to the total load bearing capacity of the component when an operational load is applied to the defined cross section P, a weighting factor $W_x$ is assigned. In step d) an acceptance criterion is defined which can be a number N, optionally having an associated tolerance range, for example t, where t is a decimal indicative of a % of the number N. For example, t may be less than 0.1, more specifically less than 0.05 and preferably of the order of 0.03 or less. The number N can be expressed as a function $f$ of the range of values for $W_x$ and $A_x$. In a simple example (without limitation) the function may be a simple sum of the products of $W_xA_x$. Thus in steps a) to d) of the method an acceptance criterion against which a manufactured component can be compared is determined.

Step e) can be carried out using any known two-dimensional imaging system, for example (without limitation) a computer tomography X-ray scanner. A two-dimensional image is taken of a plane $P^1$ which is taken at a position which corresponds to the position of plane P of step a). Since the manufacturing method will produce something with only slight variations from the nominal design, the outlines of the zones defined in step b) can be mapped directly onto the two-dimensional image (step f)). Due to small variations in the outcome of the manufacturing process, the dimensions of wall structures in any given zone of the two dimensional image may vary from those in the comparable zone of the nominal cross-section. These variations may be increases or decreases. An overall area $A_y$ of the cross-section encompassed in each zone of the two dimensional image is determined using known measuring techniques (step g)). The already determined weightings $W_x$ assigned in step c) are applied to the comparable zones of the two-dimensional image. To provide an overall comparison which takes account of the overall effect of variations in the plurality of zones, (as opposed to a simple comparison of the overall cross-sectional area of the nominal design and the manufactured component), the function $f$ is performed on the measurement data collected from step g), this will provide a numerical solution Z (step h). In a final step i), Z can be compared to N and any tolerance range which has been applied to N. From this comparison, a decision as to whether to pass or fail the manufactured component can be taken.

In an alternative embodiment, steps a) to h) may be performed over a plurality of different planes $P_z$ where z=1 to m. The acceptance criterion in such an embodiment may be a function of $P_z$ and N, for example a simple sum of all m values N for $P_z$. A tolerance might then be applied to this sum and used as an acceptance range for the manufactured component. Thus in step h) of the method, a sum of the values of Z over the same plurality of planes in the manufactured component would then be compared against the acceptance criterion and a pass/fail sentence determined dependent on whether this sum falls within a defined acceptable range.

Figure 4:
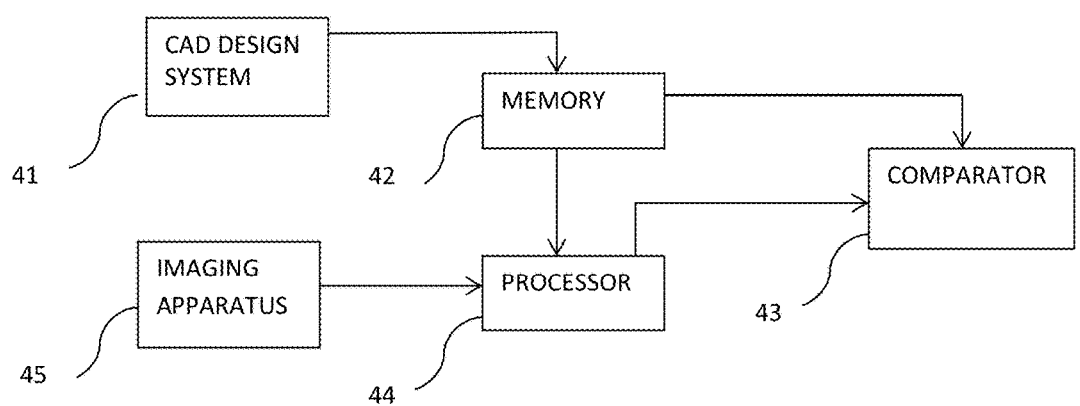
FIG. 4 shows schematically an apparatus which might be used to perform the method of the invention.

FIG. 4 shows schematically, an example of one apparatus which might be used to perform the method of the invention. As can be seen the apparatus comprises a CAD design system 41 in data communication with a memory 42. As discussed in relation to FIG. 3, steps a) to d) of the method can be performed using a CAD design system and data such as the position of plane P, the boundaries of the defined zones, the weighting values $W_x$ for each zone, the function $f$ and an acceptable result N and optional tolerance (e.g. +/−tN) can be saved in the memory. The memory, in turn, is in communication with a processor 44. The processor is also in data communication with an imaging apparatus 45 which can be used to perform steps e), f) and g) of the method. The resulting data can be accrued in the processor which can apply the weighting factors $W_x$ retrieved from the memory and subsequently apply the function $f$ also retrieved from the memory and determine a solution Z (step h). A comparator 43, which may optionally form part of the processor, is in data communication with the processor and the memory. The comparator retrieves the acceptance criterion N+/−tN from the memory and receives the result Z from the processor. Z is compared to N+/−tN and if there is a match, a pass sentence can be given, if there is a mismatch, a fail sentence can be given (step i). This final step may be output from the comparator/processor or can be performed by a person reviewing the data.

The invention claimed is:

1. A method for determining whether a manufactured component is in compliance with an operational requirement, the method comprising:
   a) pre-defining a nominal section for a compliant component;
   b) dividing the pre-defined nominal section into a plurality of zones;
   c) based on the relative contribution or relative susceptibility of each zone to a previously identified failure mode of the component, assigning a weighting factor to each zone indicative of its relative contribution;
   d) defining an acceptance criterion which is a function of cross-sectional dimensions in each zone multiplied by the assigned weighting factor;
   e) generating an image of an entire section of the manufactured component in the same position as the nominal section for the compliant component is defined;
   f) identifying in the generated image, zones comparable to the zones in the pre-defined nominal section;
   g) measuring cross-sectional dimensions of the manufactured component in the generated image zones of step f) and for each zone, multiplying by the weighting factor assigned to the corresponding zone of the pre-defined nominal section of step c);
   h) performing the function of step d) on the weighted, measured sectional dimensions of the manufactured component; and
   i) comparing the outcome of step h) against the acceptance criterion of step d) and sentencing the manufactured component as a "pass" or "fail" dependent on its compliance or non-compliance with the acceptance criterion.

2. The method as claimed in claim 1, wherein the nominal section is a two-dimensional cross-section and the zones are divisions of the cross-section.

3. The method as claimed in claim 1, wherein the nominal section is a three-dimensional section and the zones are cross-sections taken at different planes across the section.

4. The method as claimed in claim 1, wherein the nominal section is a three-dimensional section and the zones are three-dimensional sub-sections of the three-dimensional section.

5. The method as claimed in claim 1, wherein the identified failure mode is a failure to bear a pre-defined operational load and the nominal section is taken across a load bearing direction.

6. The method as claimed in claim 1, wherein the previously identified failure mode is selected from the list comprising: tensile fracture, creep, fatigue, oxidation attack and or corrosion attack.

7. The method as claimed in claim 1, wherein the measured dimensions in steps g) and h) are lengths, widths or depths.

8. The method as claimed in claim 1, wherein the measured dimensions in steps g) and h) are areas.

9. The method as claimed in claim 1, wherein the measured dimensions in steps g) and h) are volumes.

10. The method as claimed in claim 1, wherein the function of step d) is a simple sum for all zones of the product of the dimensions measured for each zone and its weighting factor.

11. The method as claimed in claim 1, wherein the acceptance criterion is a single solution to the function which must be met or exceeded.

12. The method as claimed in claim 1, wherein the acceptance criterion is a range which encompasses a solution of the function of step d).

13. The method as claimed in claim 1, wherein step a) is performed using a Computer Aided Design system.

14. The method as claimed in claim 1, wherein step e) is performed using computer tomography.

15. An apparatus for determining whether a manufactured component is in compliance with an operational requirement, the apparatus comprising:
   a processor programmed to:
      a) pre-define a nominal section for a compliant component;
      b) divide the pre-defined nominal section into a plurality of zones;
      c) based on the relative contribution or relative susceptibility of each zone to a previously identified failure mode of the component, assign a weighting factor to each zone indicative of its relative contribution;
      d) define an acceptance criterion which is a function of cross-sectional dimensions in each zone multiplied by the assigned weighting factor;
      e) generate an image of an entire section of the manufactured component in the same position as the nominal section for the compliant component is defined;
      f) identify in the generated image, zones comparable to the zones in the pre-defined nominal section;
      g) measure cross-sectional dimensions of the manufactured component in the generated image zones of step f) and for each zone, multiply by the weighting factor assigned to the corresponding zone of the pre-defined nominal section of step c);
      h) perform the function of step d) on the weighted, measured sectional dimensions of the manufactured component; and
      i) compare the outcome of step h) against the acceptance criterion of step d) and sentencing the manufactured component as a "pass" or "fail" dependent on its compliance or non-compliance with the acceptance criterion.

16. A non-transitory computer readable medium storing a computer program that causes a computer to perform steps comprising:
   a) pre-defining a nominal section for a compliant component;
   b) dividing the pre-defined nominal section into a plurality of zones;
   c) based on the relative contribution or relative susceptibility of each zone to a previously identified failure mode of the component, assigning a weighting factor to each zone indicative of its relative contribution;
   d) defining an acceptance criterion which is a function of cross-sectional dimensions in each zone multiplied by the assigned weighting factor;

e) generating an image of an entire section of the manufactured component in the same position as the nominal section for the compliant component is defined;

f) identifying in the generated image, zones comparable to the zones in the pre-defined nominal section;

g) measuring cross-sectional dimensions of the manufactured component in the generated image zones of step f) and for each zone, multiplying by the weighting factor assigned to the corresponding zone of the pre-defined nominal section of step c);

h) performing the function of step d) on the weighted, measured sectional dimensions of the manufactured component; and i) comparing the outcome of step h) against the acceptance criterion of step d) and sentencing the manufactured component as a "pass" or "fail" dependent on its compliance or non-compliance with the acceptance criterion.

* * * * *